Feb. 18, 1941.                D. V. MOSES ET AL                2,232,622
                                  H & S RECORDER
                              Filed March 23, 1940
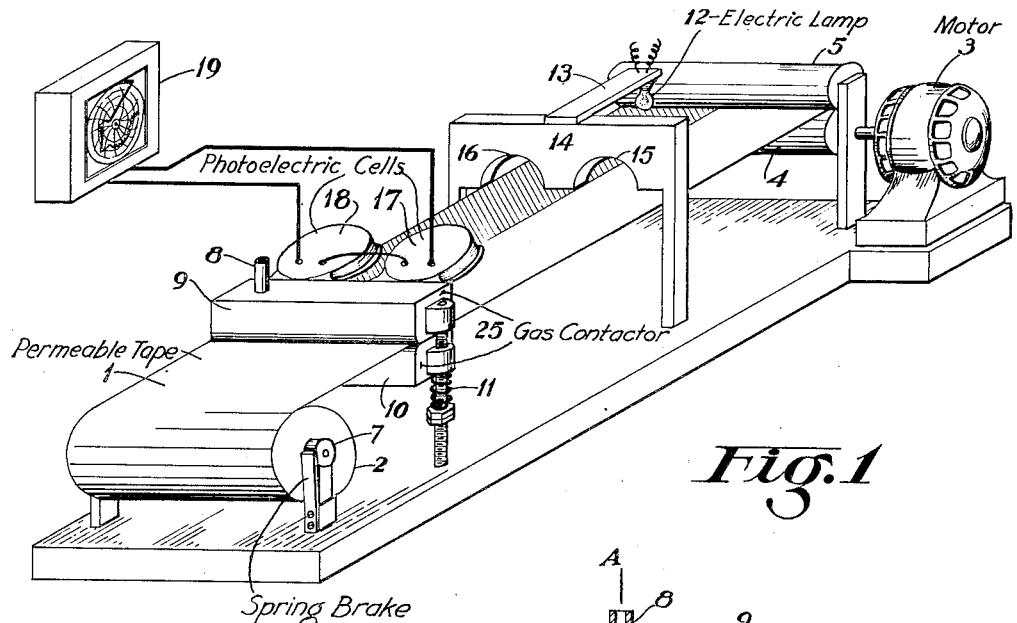
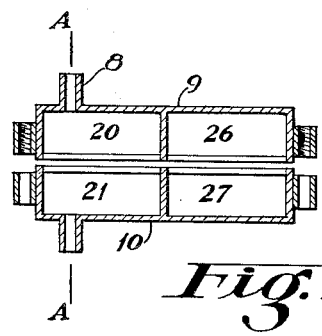
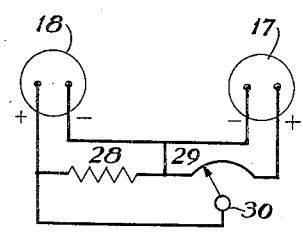
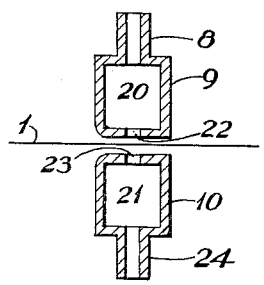
Douglas V. Moses
Lawrence T. Jilk    INVENTORS
                BY
                W. R. Gawthrop
                    ATTORNEY Patented Feb. 18, 1941

2,232,622

UNITED STATES PATENT OFFICE 2,232,622

H2S RECORDER

Douglas V. Moses and Lawrence T. Jilk, Charleston, W. Va., assignors to E. I. du Pont de Nemours & Company, Wilmington, Del., a corporation of Delaware Application March 23, 1940, Serial No. 325,575

3 Claims. (Cl. 23—255)

This invention relates to gas analysis and means for accomplishing the same. More particularly, the invention is concerned with a gas analyzer for determining and recording continuously and intermittently the concentration of a gaseous material capable of reacting with a chemically-impregnated, gas-permeable tape or ribbon to change the light-reflecting power thereof.

It is well known that certain reactive materials when contacted with active gases will produce color shades varying in intensity with the amount of the reactant gas, other factors remaining constant. It is also commonly known that the variation in color will cause a corresponding change in absorption of light beams of an appropriate wave length. Advantage is taken of these priciples in recording analyzers in which a measured flow of a gas containing a reactive constituent is contacted with color forming materials in solution, with a subsequent automatic measurement of light absorption furnishing the actuating electrical differential for a recording mechanism. However, such gas analyzers have the disadvantages of being regulated by adjusting the flow of reagent liquid rather than by mechanical means; having a large time-lag between sampling and indicating; and making substantial errors when the gas to be analyzed contains impurities which form insoluble precipitates in the reagent liquid.

It is an object of this invention to provide a new method of gas analysis, and novel means for its accomplishment. Another object is to provide gas analyzing means actuated by the proportional change in light-reflecting power of a chemically-impregnated, gas-permeable tape when acted upon by the gaseous component to be determined. Still another object is to measure the proportion of reactant gas in a gaseous mixture by measuring the difference in light-reflecting power between a portion of a gas permeable, chemically-impregnated tape which has been exposed to the reactant gas and a portion of the said tape which has not been so exposed. Yet another object is to provide means for determining the concentration of a gaseous material, which means are rapidly responsive to changes in concentration and which are not substantially affected by side-reactions. Other objects will be hereinafter apparent.

These objects are accomplished according to this invention, the particular features and advantages of which will be made clear by reference to the drawing and the ensuing description.

It has been found that in devices of the general character referred to, the use of a gas-permeable tape impregnated with a color forming material possesses many advantages over the usual method of solution contact. The extensive surface presented by the reactive material dispersed on the fibers of the permeable tape provides an extremely efficient contact with the gas passing through. There is no interference by precipitation of insoluble substances from side reactions with gas constituents other than the one to be measured. Moreover, regulation of the time of contact is made possible by mechanical means rather than by troublesome liquid-flow control devices.

The tape may be used in a substantially dry condition or as may be advisable in some cases used moist. The humidity of the gas should be adjusted accordingly.

Examples of colorimetric measurements in which an impregnated tape may be used are as follows:

| Type of gas | Active constituent | Impregnating material |
|---|---|---|
| Illuminating | Hydrogen sulfide | Alkaline lead acetate. |
| Do | Nitrogen peroxide | Griess reagent. |
| Air | Hydrogen cyanide | Congo red. |
| Exhaust gas | Carbon monoxide | Palladium chloride. |

Following is a description of one of the numerous embodiments of the invention, specifically a device for the measurement of hydrogen sulfide in illuminating gas. Referring to the drawing:

Figure 1 is a perspective view of the device.

Figure 2 is a sectional view of the gas contactor and gas collector taken lengthwise at the center.

Figure 3 is a section of the gas contactor and collector taken at right angles to that shown in Figure 2 and at a line A—A (Figure 2).

Figure 4 is a diagram of the electrical circuit used in the photoelectric cells and recording instrument.

In Figure 1, the reference character 1, designates a permeable tape, as for example an uninked typewriter ribbon composed of a multi-thread textile material previously dried after being impregnated with an aqueous solution containing 2% by weight lead acetate, 2% of sodium hydroxide and 1% of glycerin. Additional tape is provided in the roll 2 the turning of which is resisted by the spring brake 6 operating on wheel 7 which is fixed to revolve with roll 2.

The gas contactor 9 is fitted with an inlet tube 8 communicating with the interior chamber 21 at the bottom of which is slot 22. Gas collector 10 containing slot 23, chamber 21 and outlet tube 24 (not shown in Figure 1) is of substantially the same construction as the contactor 9. Compartments 26 and 27 are identical with 20 and 21 but are not supplied with gas. The contactor 9 is fixed in above and in contact with tape 1 held in position by post 25 and a duplicate not shown. Gas collector 10 is positioned beneath the contactor 9 with the tape intervening. A spring 11 and a duplicate not shown exert an upward pressure on collector 10 which is free to move vertically on post 25 clamping the tape lightly between contactor 9 and collector 10.

Photoelectric cells 17 and 18 are fixed on the gas contactor in the proper position to absorb light rays reflected from the tape below. The photoelectric cells are connected with recorder 19 by appropriate wiring as shown diagrammatically by Figure 4.

An electric bulb 12 supplied with current from a source not shown is positioned on bracket 13 on the opposite side of screen 14 from the photoelectric cells. Openings 15 and 16 in screen 14 are positioned so that light from bulb 12 falls on the tape and is reflected into the photocells.

Rollers 4 and 5 are separated by the tape 1 which is held firmly between them. Roller 4 is revolved at a predetermined rate by small synchronous motor 3 which is supplied from a source of current not shown.

Interference from outside light sources can be avoided, if it is found necessary, by installing the entire device with the exception of the recorder in a suitable light-proof case.

Figure 4 is a diagram of the electrical circuit used in transferring the electrical impulse obtained from the photoelectric cells to an indicating or recording instrument. Photoelectric cells 17 and 18 are connected in opposition, that is, minus to minus and plus to plus. The remainder of the circuit is that of a well known commercially available recording potentiometer. A variable resistance 29 is controlled with an automatic mechanism (not shown) in such a manner that no current is registered by galvanometer 30. After being balanced, changes in the intensity of light to either (but not both) of the cells will result in an unbalanced circuit causing current to flow in the galvanometer which in turn actuates the automatic mechanism controlling the variable resistance and again brings the circuit in balance. The position of the variable resistance serves to indicate or record the magnitude of the change in potential and consequently in light intensity.

In the operation of the device, the impregnated tape 1 is drawn by the revolving roller 4 at a fixed rate through the opening between the gas contactor 9 and gas collector 10, beneath the photo-electric cells 17 and 18, and under the screen 14. Previous to starting the gas flow the circuit is balanced by adjusting the fixed resistance values within the recorder or changing the position of light 12 with reference to the openings 15 and 16, until the recorder is made to register zero. A metered constant flow of gas containing hydrogen sulfide is passed into chamber 20 through tube 8 from an outside source not shown. The gas passing downward through the slot 22 filters through tape 1, passes through slot 23, chamber 21 and through tube 24 to an appropriate place of disposal. In filtering through the tape the hydrogen sulfide reacts with the lead salt producing a brown stain on approximately half of the width of the tape. With a fixed rate of tape movement and a fixed rate of gas flow the intensity of the stain will be found to vary with the concentration of hydrogen sulfide in the gas unless the exposure is such as to produce virtually complete sulfiding of the impregnating compound. In this contingency it is only necessary to decrease the gas flow or to increase the tape speed by supplying an appropriate gear connection between the motor 3 and roller 4. Oppositely, the color intensity of the stain may be increased if desired by slowing the tape or by increasing the gas flow.

Light from bulb 12 passing through the slot 16 falls on the stained portion of the tape 1 and is reflected in a diminished quantity into photoelectric cell 18. Similarly light from bulb 12 passes through slot 15 and is reflected from the unstained tape into cell 17. The decrease in the quantity of light entering cell 18 causes an unbalanced electrical condition which is measured and recorded by the recording instrument 19. Changes in the light reflecting character of the tape or in intensity of light delivered by bulb 12 are compensated for by the correction imposed by the cell 17 operating on the unaffected portion of the tape.

By the use of standard gases containing known amounts of hydrogen sulfide, it is readily possible to determine the amount of movement produced in the recorder by various concentrations and to construct a scale or chart from which concentrations in any of the standard units of expression such as grams of hydrogen sulfide per hundred cubic feet of gas, can be read directly.

It is readily apparent from the illustration that many variations of the device may be made without departing from the spirit and scope of the invention.

We claim:

1. Apparatus for continuous measuring of the hydrogen sulfide content of gases containing the same, comprising a light reflecting gas pervious strip impregnated with a substance color sensitive to hydrogen sulfide, means for continuously subjecting a first portion of said strip to contact with gas to be tested while a second portion is not so subjected, means for projecting separate light beams on each of said strip portions, two photo-electric cells arranged to intercept said light beams reflected from each of said portions after the first thereof has been contacted with gas as described and means for indicating differences in electrical conditions of said cells.

2. In apparatus for continuously measuring the hydrogen sulfide content of gases, the combination of a light-reflecting, gas-pervious strip impregnated with a substance color-sensitive to hydrogen sulfide, means for continuously passing a sample of the gas to be tested through a first portion of said strip while a second portion is not so subjected, means for advancing fresh portions of the strip, and photo-electric means for estimating the difference in light reflecting power between the gas-contacted first portion and the non-contacted second portion of the gas-pervious strip.

3. Apparatus for continuously measuring the hydrogen sulfide content of gases containing the same comprising a light-reflecting, gas-pervious textile tape impregnated with alkaline lead acetate, means for continuously passing a sample of the hydrogen sulfide containing gas into contact with and through a first portion of said tape while a second portion is not so subjected, means for continuously advancing fresh portions of the tape, a single light source, means for projecting separate light beams of equal intensity from said source on each of said first and second tape portions, twin photo-electric cells arranged to intercept said light beams reflected from each of said portions after the first thereof has been contacted with gas as described and recording means for indicating the difference in electrical potential between said cells.

DOUGLAS V. MOSES.
LAWRENCE T. JILK.